United States Patent [19]

Hahn et al.

[11] Patent Number: 4,836,921
[45] Date of Patent: Jun. 6, 1989

[54] WASTE WATER TREATMENT APPARATUS

[75] Inventors: Joseph A. Hahn, Island Lake; John E. House, Wheaton, both of Ill.

[73] Assignee: Magnaflux Corporation, Chicago, Ill.

[21] Appl. No.: 8,854

[22] Filed: Jan. 30, 1987
(Under 37 CFR 1.47)

[51] Int. Cl.$^4$ ............................................. C02F 1/52
[52] U.S. Cl. .................................. 210/202; 210/203; 210/208; 210/241; 210/282; 210/316
[58] Field of Search ............... 210/708, 203, 241, 258, 210/260, 282, 314, 494.1, 497.1, 202, 208, 316, 317, 424

[56] References Cited

U.S. PATENT DOCUMENTS

| | | | |
|---|---|---|---|
| 2,555,201 | 5/1951 | Nordell | 210/497.1 |
| 2,604,991 | 7/1952 | Rogers | 210/282 |
| 3,035,701 | 5/1962 | May | 210/314 |
| 3,528,284 | 9/1970 | Skoglund et al. | 210/167 |
| 3,828,934 | 8/1974 | Green et al. | 210/494.1 |
| 3,870,033 | 3/1975 | Faylor et al. | 210/900 |
| 4,222,877 | 9/1980 | Silva | 210/484 |
| 4,465,593 | 8/1984 | Wemhoff | 210/203 |
| 4,664,798 | 5/1987 | Bergh | 210/241 |

*Primary Examiner*—Peter Hruskoci
*Attorney, Agent, or Firm*—Thomas W. Buckman; Neal C. Johnson

[57] ABSTRACT

A compact portable wastewater treatment apparatus for treating oil contaminated waste water having a support structure with a containment tank on said support structure for receiving waste water. A mixing means on the support structure is also provided for mixing the waste water with a desired amount of materials to form a flocculent with the oil of the oil contaminated waste water. Furthermore, filters are included on the support structure for filtering the flocculent from the waste water with a pump structure for transporting the waste water within the system.

3 Claims, 1 Drawing Sheet

WASTE WATER TREATMENT APPARATUS

BACKGROUND OF THE INVENTION

The present invention relates to a water treatment apparatus, and, more particularly, to a portable water treatment apparatus for treatment of oil contaminated water.

Treatment of waste water has been accomplished in a variety of ways to remove certain harmful elements from water before the water is returned to a public sewage system. These elements can range from any number of toxic chemicals to a simple form of dirt or oil. Presently, the Environmental Protection Agency (EPA) imposes certain requirements on the users of such water to prevent dangerous exposure of chemicals to the public. Additionally, a specific treatment of known chemicals in waste water by the user lessens the burden and the risk of improper purification by the public water treatment facility.

The majority of existing waste water treatment apparatuses are designed for treating large quantities of waste water and are, consequently, too expensive and bulky for the average user. These large units have mostly been used by large corporations who have both the need and the ability to process large quantities of waste water.

Normally, the average user relies on disposal of his waste water through commercially available disposal companies. This average user is normally a small manufacturer, machine tool shop or similar type of user who generates waste water in the form of a cutting oil or a penetrant waste liquid which is used in the non-destructive testing field. Therefore, not only is such commercial disposal expensive, but it necessitates having to store waste liquid until it can be properly disposed of.

Some of the existing waste water treatment apparatuses suffer from continual clogging of their filtering apparatus from the residue of flocculent which is produced by the chemical treatment of oil contaminated water. Other apparatuses do not properly remove all the water from the flocculent. This not only provided a flocculent "sludge" which is very heavy but also necessitates the use of commercial disposal which is undesirable.

The need currently exists for a waste water treatment apparatus for the average user which is compact, inexpensive, versatile and portable. The present invention provides such an apparatus with a unique filtering system which is aimed at the treatment of oil contaminated water. Such water is common in the numerous small and mid-size businesses who use various types of cutting fluids and machining operations. Additionally, oil contaminated waste water is readily used in the magnetic particle testing area of non-destructive testing which normally accompanies machining processes to ensure that a machine part does not suffer from any defects.

In the present invention, a portable cart is provided with a mixing/settling container or drum, a mixer and a series of filters connected by tubing which filter the oil out of the water. This filtering is accomplished by the addition of certain chemicals which break the oil from the water and separate the initial waste water into two layers. These chemicals actually combine with the oil molecules to form a "flock" which has an initial density greater than the water and is somewhat of a solid in form and forms a first layer. The second layer is the remaining waste water after the chemicals have combined with the oil and is substantially oil free. This "flock" is then filtered out from the remaining waste water to obtain a substantially oil free water.

The separatoin of the flock in the water can be accomplished in two ways. When the oil in the water is basically heavy and the mixing is of a relatively short duration, the flock will settle to the bottom of the container with the remaining waste water above the flock. When the oil is somewhat lighter and the mixing is of a relatively longer duration, air introduced into the flock enables it to rise to the top of the container with the remaining waste water below the flock. In either event, after separation occurs the flock is introduced into a first large particle filtering stage of the filter which removes the vast majority to the flock from the water. The outlet of this filter then leads to a third small particle filtering stage to remove more minute flock particles. The remaining waste water which is separated in the container can bypass the first large particle filter and proceed to a second medium particle filter and then to the third small particle filter as the user may see fit in order to reduce treatment time.

Upon exiting the third small particle filter, the water, which meets EPA standards, is ready for disposal into a public water treatment system and will be further processed for human use.

It is therefore an object of the present invention to provide a compact, portable, inexpensive apparatus for the treatment of oil contaminated water.

It is a feature of this invention to provide a unique filtering system which is capable of filtering particles of different sizes.

It is an advantage of the present invention that the system is not affected by any unnecessary clogging of the filtering system and produces a residue which is substantially water free.

BRIEF DESCRIPTION OF THE DRAWINGS

The features of the present invention which are believed to be novel are set forth with particularity in the appended claims. The invention, together with further objects and advantages thereof may best be understood by making reference to the following description taken in conjunction with the accompanying drawings, and the several figures of which like reference numerals identify identical elements and wherein:

DESCRIPTION OF THE PREFERRED EMBODIMENT

Figure 1:
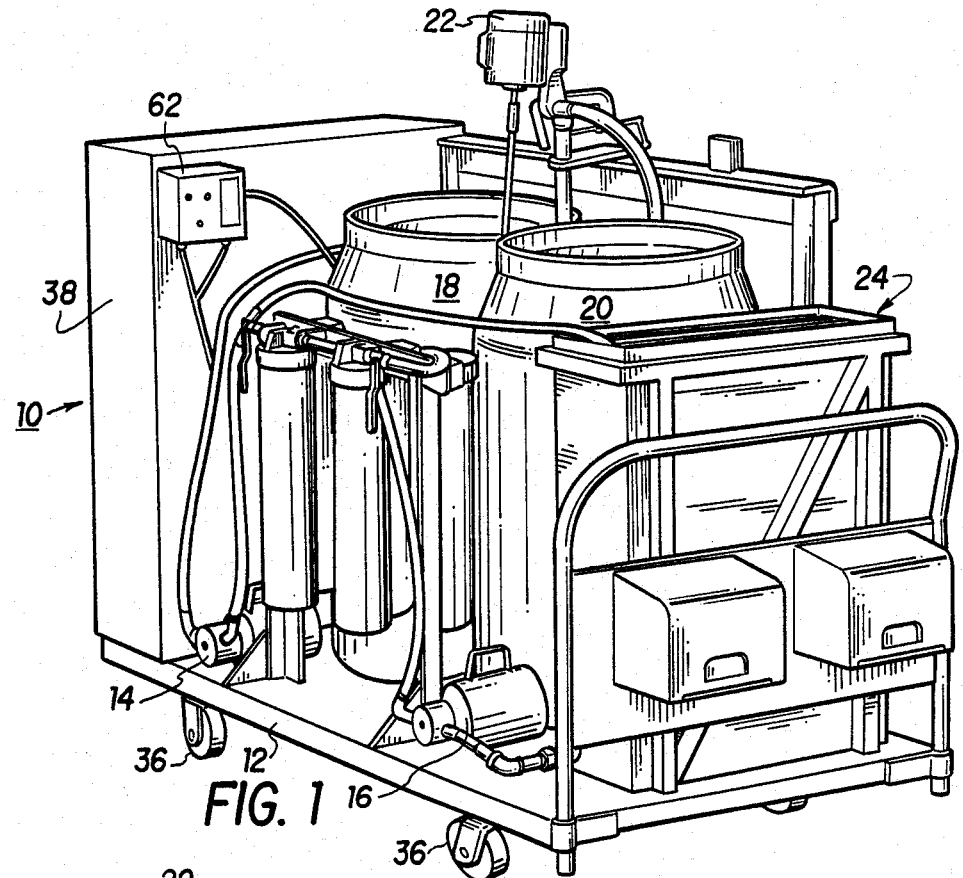
FIG. 1 is a perspective view of the waste water treatment apparatus of the present invention.
Figure 2:
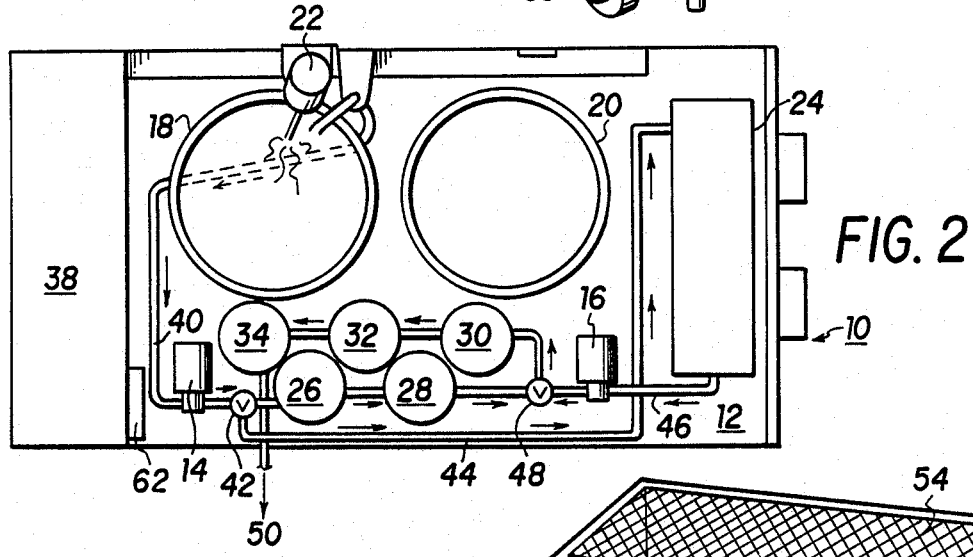
FIG. 2 is a top plan view of the apparatus of FIG. 1.

Referring now to the drawings in greater detail, there is illustrated in FIG. 1 a filtering apparatus 10 constructed in accordance with the teachings of the present invention. The apparatus 10 includes a platform cart 12 which is arranged to support pumps 14 and 16, a pair of drums 18 and 20, a mixer 22, a large particle filter box 24, medium particle filter components 26 and 28 and small particle filter components 30, 32 and 34. The platform is supported by four wheel assemblies 36 at least two of which may be swiveled, to provide movement between locations where the apparatus is to be used and where it is to be stored. Disposable filter elements, filter papers, treatment chemicals and other supplies are conveniently stored in the cabinet 38 on one end of the platform cart 12.

The apparatus 10 is designed for and is especially advantageous for treatment of waste waters produced when using oil base penetrants which are used to locate cracks or similar defects in various types of articles. However, it will be understood that the invention is not limited to treatment of such waste waters and may be used in treatment of other oil contaminated liquid wastes for example, machine tool cutting fluids.

Typically, waste water is dumped or pumped into one of the drums 18 or 20 and a treatment operation is initiated when the drum is nearly full. First, a destabilizing chemical is added to the waste water, operative to "break" the oil/water emulsion and to make separation possible. The mixer 22 is operated to mix in the destabilizing chemical. Then an oil attracting material is added and the mixer 22 is used to mix it in and to allow it to combine with the oil and form a flocculent of solid or semi-solid form which can then be separated from the water.

This process is well known in the art and it is shown and described in U.S. Pat. No. 3,528,284 to H. N. Skogound et al which is assigned to the assignee of the present invention and is incorporated herein by reference.

Flocculent produced is then pumped out of the outlet hose 40 by pump 14 to a first three-way valve 42. This valve 42 will be positioned to permit the flock to flow through tube 44 to the filter box 24 for the first filtering stage. After filtering in filter box 24, the remaining water is pumped out through filter box exit hose 46 by pump 16 to a second three-way valve 48. This valve 48 will be positioned to permit the water to flow to filters 30, 32 and 34, which are hooked in series, while bypassing filters 26 and 28. Upon exiting filter 34, the water is suitable for disposal to a drain 50 of a public sewage system.

After the operator discerns that the majority of the flocculent is removed from the drum 18 or 20, he then operates the apparatus to filter the water left in the drum 18 or 20. This operation is accomplished by the turning of both valves 42 and 48. The flow of water will now proceed through outlet hose 40 by pump 14 to a first three-way valve 42 and then directly into filter 26 which is hooked in series with filter 28. Upon exiting filter 28, the water will then flow through the second three-way valve 48 to filter 30 in series with filters 32 and 34 and then to the drain 50.

By this process, filter box 24 filters out the largest particles of flock and produces a water which is ready for the small particle filters 30, 32 and 34 and can bypass the medium particle filters 26 and 28. Similarly, the water remaining in the tanks 18 or 20 after separation with the flock does not contain any large particles of flock and can therefore bypass the filter box 24 and proceed directly to medium particle filters 26 and 28.

Both pumps 14 and 16 can be of any type of commercially available pump which will sufficiently handle both the waste water and the flocculent. To accomplish this, neither pump 14 or 16 should have any type of filtering means associated with their flow.

The mixing drums 18 and 20 can be any type of mixing container which will permit sufficient mixing of the chemicals needed to separate the oil from the water and will not adversely react with any of the elements contained therein. In the preferred embodiment, two drums are shown so that filtering can be accomplished from one drum 18 while settling of the contents is carried on in the second drum 20 in order to save processing time.

The mixer 22, is connected to a support frame 52 which runs between drums 18 and 20 and extends upwardly from the cart 12. This mixer 22 can by any type of commercially available mixer and in the preferred embodiment consists of a motor housing with an output shaft having mixer blades at its distal end (not shown). Furthermore, the mixer 22 may incorporate a clamp 53 which enables it to be affixed to the support frame 52 in a stable position to effect mixing in either drum 18 or 20.

Figure 3:
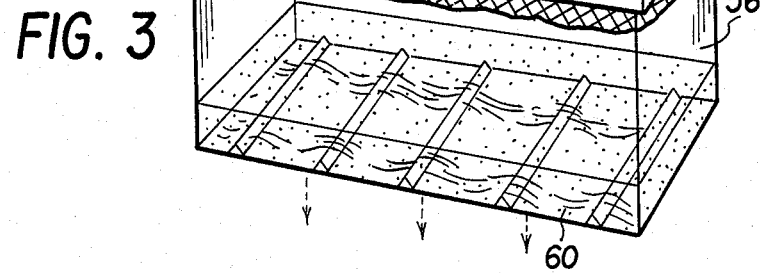
FIG. 3 is a cross section of the large particle filtering stage of the present invention.

The filter box 24 contains a filter section 54 and a tank section 56 as illustrated in FIG. 3. Although any large type of filtering medium can be used, the filter section 54 of the preferred embodiment consists of a filter bed which is composed of a fiberglass blanket of insulation which is readily available. A second filtering may also be employed within the filter box 24 by arranging filter papers 60 to further filter the flock before the water is removed from the tank section 56 of the filter box 24. This two-stage filtering within the box permits filtering of large particles of flock without clogging or impeding the flow of water.

Both the medium particle filters 26 and 28 as well as the three small particle filters 30, 32 and 34 are all filters of a cartridge type design. This design enables water to enter the top of the filter, filter through the medium within the cartridge and exit at the top of the filter to proceed to the next filtering stage. Additionally, although the specific type of filtering medium used within the cartridges depends on the type of filtering to be done, the preferred embodiment of the present invention employs resin treated paper filtering cartridges in filters 26, 28 and 30, while filter 32 consists of a polypropylene cartridge and filter 34 is a small particle carbon cartridge filter. Upon exiting the end filter 34, the resulting water is sufficiently filtered to meet and exceed current EPA standards for its return to a public sewage treatment system.

The outlet hose 40 as well as most of the connecting hoses used throughout the system, can be any type of connecting hose which will sufficiently transport both water and flocculent. In the preferred embodiment, a commercially available pliable plastic or rubber hosing is used which is transparent so that flow of flocculent or water can be observed through the tube.

The valves 42 and 48 can also be of any commercially available three-way valve design and in the preferred embodiment are standard T-shaped valves where flow can be directed from one direction to another.

All of the electrical components within the system are wired through a control box 62 which can be connected to a readily available outlet plug within the users manufacturing facility. Since this wiring is not a part of the present invention, it is not shown or described in detail but generally consists of a standard switch to control each pump independently and can be of any design which will accomplish this function.

Operation of the filtering apparatus 10 will now be described in specific detail for two separate methods of operation. The first method, as described earlier, will be the case where the flocculent within either of the drums 18 or 20 is settled to the bottom and the second method will be where the flocculent has risen to the top of either drum 18 or 20.

In the first instance, flock will settle to the bottom of either container 18 or 20 when the oil in the water is basically heavy and the mixing is of a relatively short duration. When this situation occurs, outlet hose 40 is inserted all the way to the bottom of either the mixing drums 18 or 20 so that flocculent may first be removed from either of those drums. Pump 14 beings to flow which then directs the flocculent through valve 42 which is in a position to permit the flocculent to flow directly to tube 44 to the filter box 24. The flow of flocculent enters the top of filter box 24 and the majority of the large particles are trapped by the fiber glass blanket which catches the majority of the large particles without becoming clogged. The resulting waste water after such filtering accummulates within the tank section 56 of filter box 24. Near the bottom of filter box 24, a second filtering within the box 24 may also be accomplished by arranging filter papers 60 of a desired filtering capacity. After the operator observes that the majority of the flocculent has been removed from either drum 18 or 20, and that basically the separated water is all that remains within the drum, valve 42 is then turned to permit the water from the drum 18 or 20 having smaller particles of flocculent to pass directly to filters 26 and 28, then through valve 48 which is positioned to permit the water then to flow directly to filters 30, 32, 34 and to the outlet drain 50. Then, after all the water is drained out of either drum 18 or 20, pump 14 is turned off and pump 16 is activated with valve 48 positioned to permit flow of now filtered flocculent water from the bottom of filter box 26 directly to filter 30, 32 and 34 and subsequently to drain 50.

In the second instance, when the oil is somewhat lighter and the mixing is of a relatively longer duration, air, which is introduced into the flock either by mixing or by some type of external air injection means (not shown), enables the flock to rise to the top of either mixing drum 18 or 20. In this case, outlet hose 40 is still positioned in the bottom of either mixing drum 18 or 20 but now when pump 14 is activated water which has been separated from the flocculent is first pumped to valve 42 which is in such a position as to permit the water to flow directly to filters 26 and 28 then to valve 48 which is positioned so as to permit the water to flow directly to filters 30, 32, 34 and to drain 50. Then, after the operator sees that mostly flocculent is left within either mixing drum 18 or 20, valve 42 is positioned so as to permit the flocculent to flow directly through tube 44 and to filter box 24 for filtering of large particles. After all the flocculent has been removed from either mixing drum 18 or 20, pump 14 is turned off and pump 16 is activated to pump now filtered flocculent water from the bottom of filter box 24 to valve 48 which is now positioned so as to permit flow of such water directly to filters 30, 32, 34 and to drain 50.

It is also to be noted that the separate step of filtering the separated water within the mixing drums 18 and 20 through filters 26 and 28 may be bypassed completely. In this instance, valve 14 will remain in the position so as to permit both flocculent and separated water to flow into tube 44 for filtering in filter box 24 and then proceed through valve 48 directly to filters 30, 32 and 34. However, since settling and filtering within filter box 24 may take time, the previously described method of filtering separated water through filters 26 and 28 is included as a time saver since no real large particles should exist within the separated water. Therefore, filtering can more rapidly be accomplished by permitting the separated water within drum 18 or 20 to flow through filters 26 and 28 thereby avoiding filter box 24.

While a particlar embodiment of the present invention has been shown and described, modifications may be made to the apparatus without departing from the teaching of the present invention. Accordingly, the scope of the invention is only to be limited as necessitated by the accompanying claims.

I claim:

1. A compact portable wastewater treatment apparatus for treating oil contaminated waste water comprising:

a support structure having wheel means for transporting said structure to a desired location;

at least one containment means on said support structure for receiving and holding said waste water;

mixing means on said support structure arranged in said containment means for mixing said waste water with a desired amount of materials to form a flocculent containing said oil and including large, intermediate and small flock particles, and residue water, wherein said containment means is constructed such that said flocculent settles to the bottom of said containment means and said residue water rises to the top of said containment means when said oil of said waste water is relatively heavy oil and the mixing time is relatively short in duration and wherein said flocculent rises to the top of said containment means and said residue water settles to the bottom of said containment means when said oil of said waste water is a relatively light oil and the mixing time is relatively long in duration;

a first filtering means for filtering large flock particles from said residue water, wherein said first filtering means further comprises a tank having a porous blanket for receiving said flocculent and said residue water, filtering said flocculent from said residue water, and holding residual water after filtering by said blanket, and wherein said tank further comprises filter paper arranged in its bottom for filtering said residual water received from said holding portion of said tank;

a second filtering means for filtering intermediate flock particles from said residue water;

a third filtering means for filtering small flock particles from said residue water;

a first valve means for receiving said residue water and said flocculent from said containment means and having a selectable first position for directing said flocculent to said first filtering means and having a selectable second position for directing said residue water to said second filtering means respectively;

a second valve means having a selectable first position for receiving said residue water from said second filtering means and having a selectable second position for receiving flocculent residue water from said first filtering means respectively and for directing both said residue water and said flocculent residue water to said third filtering means;

a first pump means for pumping said residue water and flocculent from the bottom of said containment means to and through said first valve means to said second and first filtering means respectively and for pumping said residue water through said second filtering means to and through said second valve means to and through said third filter means; and a second pump means for pumping said flocculent residue water from said first filter means to and through said second valve means to and through said third filter means.

2. The apparatus of claim 1, wherein said third filtering means further comprises:

at least one cartridge filter having a polypropylene filter medium.

3. The apparatus of claim 2, wherein said third filtering means further comprises:

at least one cartridge filter having a carbon filter medium.

* * * * *